(12) United States Patent
Vasquez et al.

(10) Patent No.: US 8,493,198 B1
(45) Date of Patent: Jul. 23, 2013

(54) VEHICLE AND MOBILE DEVICE TRAFFIC HAZARD WARNING TECHNIQUES

(75) Inventors: Juan Vasquez, San Jose, CA (US); Vinson Mok, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/546,563

(22) Filed: Jul. 11, 2012

(51) Int. Cl.
*B60Q 1/00* (2006.01)

(52) U.S. Cl.
USPC .................. 340/436; 340/438; 340/425.5

(58) Field of Classification Search
USPC .................. 340/904, 438, 436, 425.5
See application file for complete search history.

(56) References Cited

U.S. PATENT DOCUMENTS

| | | | |
|---|---|---|---|
| 3,559,164 A | 1/1971 | Bancroft et al. | |
| 5,515,026 A | 5/1996 | Ewert | |
| 5,624,731 A | 4/1997 | Desjardins | |
| 5,734,336 A | 3/1998 | Smithline | |
| 6,104,313 A | 8/2000 | Boyd, II | |
| 6,351,211 B1 | 2/2002 | Bussard | |
| 6,850,170 B2 | 2/2005 | Neff | |
| 6,911,917 B2 | 6/2005 | Higgs | |
| 7,202,776 B2 * | 4/2007 | Breed | 340/435 |
| 7,295,925 B2 | 11/2007 | Breed et al. | |
| 7,418,346 B2 | 8/2008 | Breed et al. | |
| 7,426,437 B2 | 9/2008 | Breed et al. | |
| 7,474,205 B2 | 1/2009 | Trela | |
| 7,492,281 B2 | 2/2009 | Lynam et al. | |
| 7,573,401 B2 | 8/2009 | Wabeke | |
| 7,610,146 B2 | 10/2009 | Breed | |
| 7,630,806 B2 | 12/2009 | Breed | |
| 7,633,383 B2 | 12/2009 | Dunsmoir et al. | |
| 7,663,505 B2 | 2/2010 | Publicover | |
| 7,783,420 B2 | 8/2010 | Oonishi et al. | |
| 7,791,503 B2 | 9/2010 | Breed et al. | |
| 7,796,081 B2 | 9/2010 | Breed | |
| 7,821,421 B2 | 10/2010 | Tamir et al. | |
| 7,840,342 B1 | 11/2010 | Breed | |
| 7,840,355 B2 | 11/2010 | Breed et al. | |
| 7,859,432 B2 | 12/2010 | Kim et al. | |
| 7,876,203 B2 | 1/2011 | Traylor et al. | |
| 7,880,596 B2 | 2/2011 | Lynam et al. | |
| 7,899,621 B2 | 3/2011 | Breed et al. | |
| 7,949,468 B2 | 5/2011 | Nakayama et al. | |
| 7,979,172 B2 | 7/2011 | Breed | |
| 7,979,173 B2 | 7/2011 | Breed | |
| 7,983,836 B2 | 7/2011 | Breed | |
| 8,000,897 B2 | 8/2011 | Breed et al. | |
| 8,085,166 B2 | 12/2011 | Tamir et al. | |
| 8,170,787 B2 | 5/2012 | Coats et al. | |
| 2005/0134440 A1 * | 6/2005 | Breed | 340/435 |

(Continued)

*Primary Examiner* — Travis Hunnings
(74) *Attorney, Agent, or Firm* — Leydig, Voit & Mayer, Ltd.

(57) ABSTRACT

A computer-implemented method includes monitoring an environment external to a vehicle via a sensor of the vehicle or a mobile device. The monitoring includes recording audio or video signals based on an output of the sensor. Audio or image recognition is performed via the mobile device based on the audio or video signals. Based on results of the audio or image recognition, objects in an area through which the vehicle is to pass are detected. The method includes determining which ones of the detected objects satisfy a predetermined criteria. The predetermined criteria includes object features that are indiscernible or marginally discernible to a vehicle operator with a perception deficiency. Selected ones of the detected objects that satisfy the predetermined criteria are monitored. The vehicle operator is alerted of the selected ones of the detected objects with an alert predetermined to be discernible to the vehicle operator.

30 Claims, 5 Drawing Sheets

U.S. PATENT DOCUMENTS

| | | |
|---|---|---|
| 2005/0152142 A1 | 7/2005 | Traynor |
| 2005/0265584 A1 | 12/2005 | Dobson et al. |
| 2007/0103341 A1 | 5/2007 | Kreiner et al. |
| 2008/0147253 A1 | 6/2008 | Breed |
| 2008/0154629 A1 | 6/2008 | Breed et al. |
| 2008/0195284 A1 | 8/2008 | Hammadou |
| 2009/0030605 A1 | 1/2009 | Breed |
| 2009/0070031 A1 | 3/2009 | Ginsberg |
| 2009/0224942 A1 | 9/2009 | Goudy et al. |
| 2009/0259401 A1 | 10/2009 | Edwards et al. |
| 2010/0057336 A1 | 3/2010 | Levine et al. |
| 2010/0100268 A1* | 4/2010 | Zhang et al. .................. 701/25 |
| 2010/0256835 A1 | 10/2010 | Mudalige |
| 2010/0280751 A1 | 11/2010 | Breed |
| 2010/0299000 A1* | 11/2010 | Nakamura et al. ................ 701/1 |
| 2010/0299021 A1 | 11/2010 | Jalili |
| 2011/0082623 A1 | 4/2011 | Lu et al. |

* cited by examiner

VEHICLE AND MOBILE DEVICE TRAFFIC HAZARD WARNING TECHNIQUES

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An operator of a vehicle may have a perception deficiency, such as a color-blind or hearing deficiency. An operator who is color-blind may misconstrue certain objects, such as traffic signs and lights. For example, the operator may misconstrue a sodium vapor street light (a white light with a reddish tint) as a red stop light, and thus needlessly press on a brake of the vehicle to slow the vehicle to a stop. As another example, the operator may misconstrue a green or yellow traffic light as a red light or vice versa. An operator who has a hearing deficiency may be unable to hear or may misconstrue, for example, sounds of a railroad crossing. As a result of the perception deficiency, the operator may mistakenly accelerate or decelerate the vehicle, potentially resulting in an accident.

Vehicle operators, regardless of whether they have a perception deficiency, can at times be distracted and either not see or react slowly to traffic control and road hazard devices (collectively referred to as traffic indicators), often resulting in an accident.

SUMMARY

A computer-implemented method is provided and includes monitoring, via a sensor associated with at least one of a vehicle and a mobile device, an environment external to the vehicle. The monitoring of the environment includes recording audio signals or video signals of the environment based on an output of the sensor. The method further includes performing (i) audio recognition based on the audio signals via a recognition module of the mobile device or (ii) image recognition based on the video signals via the recognition module of the mobile device. At the mobile device and based on results of the audio recognition or the image recognition, objects in an area through which the vehicle is to pass are detected. The method further includes at the mobile device, determining which ones of the detected objects satisfy one or more predetermined criteria. The one or more predetermined criteria include object features that are indiscernible or marginally discernible to a vehicle operator with a perception deficiency. At the mobile device, selected ones of the detected objects to monitor are identified when the selected ones of the detected objects satisfy the one or more predetermined criteria. The vehicle operator is alerted of the selected ones of the detected objects with an alert predetermined to be discernible to the vehicle operator.

A computer-implemented technique is provided that can include monitoring, via a sensing network mounted within a mobile device, an environment external to a vehicle. The monitoring of the environment can include capturing, by the mobile device and from within a vehicle, images of the environment. At the mobile device, an image signal can be generated that represents the captured images. Image recognition can then be performed based on the image signal, via a recognition module of the mobile device. At the mobile device, objects in a path of the vehicle can be detected based on results of the image recognition. The technique can further include determining, at the mobile device, which ones of the detected objects satisfy one or more predetermined criteria. The one or more predetermined criteria can include object features that are indiscernible by a color-blind vehicle operator. The object features can include patterns of traffic indicators that have one or more colors predetermined to be indiscernible by the color-blind vehicle operator. At the mobile device, selected ones of the detected objects are identified as traffic indicators to monitor when the selected ones of the detected objects satisfy the one or more predetermined criteria. The color-blind vehicle operator can be alerted, via the mobile device, if one or more of the detected objects are identified as having one or more of the patterns. The alerting of the vehicle operator includes altering an image of the detected objects having the one or more of the patterns on a display of the mobile device.

In other features, a computer-implemented technique is provided that can include monitoring, via a sensing network mounted within a mobile device, an environment external to a vehicle. The monitoring of the environment can include capturing, by the mobile device and from within the vehicle, images of the environment. At the mobile device, an image signal can be generated that represents the captured images. Image recognition can be performed based on the image signal, via a recognition module of the mobile device. At the mobile device, objects in a path of the vehicle can be detected based on results of the image recognition. At the mobile device, selected ones of the detected objects are identified as traffic indicators to monitor based on one or more predetermined criteria. The one or more predetermined criteria can include, for example, patterns of the traffic indicators. A vehicle operator can be alerted, via the mobile device, of the detected objects identified as having one or more of the patterns.

In other features, a mobile device is provided that can include a sensor configured to (i) monitor an environment external to a vehicle, (ii) capture images of the environment from within the vehicle, and (ii) generate an image signal that includes the captured images. A recognition module can be configured to: (i) at least one of perform image recognition and request performance of the image recognition based on the image signal, and (ii) detect objects in a path of the vehicle based on results of the image recognition. An object indicator module can be configured to identify selected ones of the detected objects as traffic indicators to monitor based on one or more predetermined criteria. The one or more predetermined criteria can include, for example, patterns of the traffic indicators. An alert network can be configured to alert a vehicle operator of the detected objects identified as having one or more of the patterns.

In other features, a computer-implemented technique is provided that can include monitoring, via a sensing network mounted within a mobile device, an environment external to a vehicle. At the mobile device, an image signal can be generated. Image recognition can be performed based on the image signal, via the recognition module of the mobile device. At the mobile device, objects in a path of the vehicle can be detected based on results of the image recognition. At the mobile device, selected ones of the detected objects are identified as traffic indicators to monitor based on one or more predetermined criteria. The one or more predetermined criteria can include object features indiscernible by a color-blind vehicle operator. The object features can include, for example, patterns of the traffic indicators that have one or more colors predetermined to be indiscernible by the color-blind vehicle operator. The color-blind vehicle operator can be alerted, via an alert network, of the detected objects having the one or more of the patterns.

In other features, a technique is provided that can include a sensing network configured to (i) monitor an environment external to a vehicle and (ii) generate an image signal. A recognition module can be configured to: (i) at least one of perform image recognition and request performance of the image recognition based on the image signal, and (ii) detect objects in a path of the vehicle based on results of the image recognition. An object indicator module can be configured to identify selected ones of the detected objects as traffic indicators to monitor based on one or more predetermined criteria. The one or more predetermined criteria can include object features that are indiscernible by a color-blind vehicle operator. The object features can include, for example, patterns of the traffic indicators that have one or more colors predetermined to be indiscernible by a color-blind vehicle operator. An alert network can be configured to alert the color-blind vehicle operator of the detected objects identified as having one or more of the patterns.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
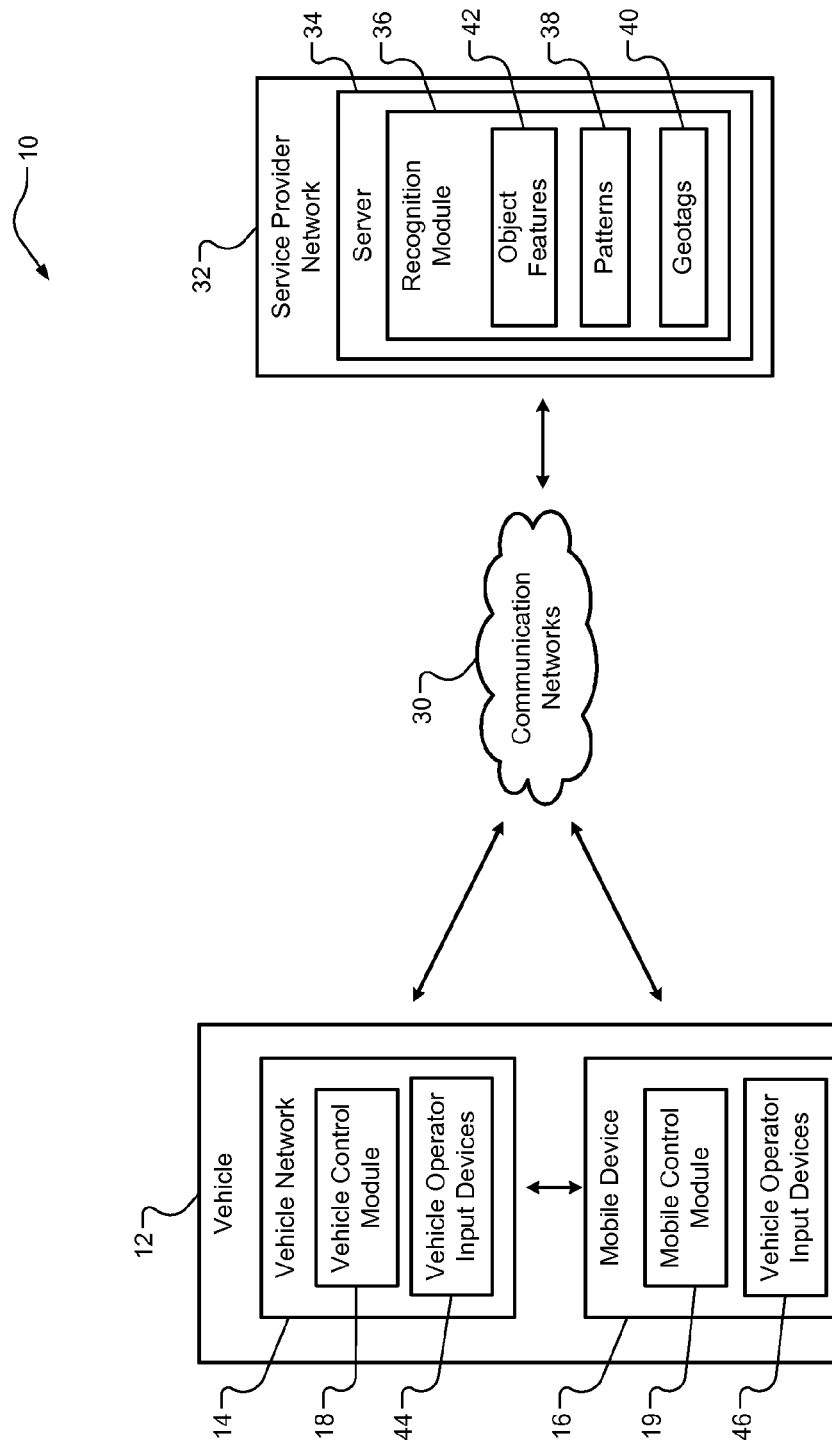
FIG. 1 is a functional block diagram of an example object monitoring network in accordance with one implementation of the present disclosure.
Figure 4:
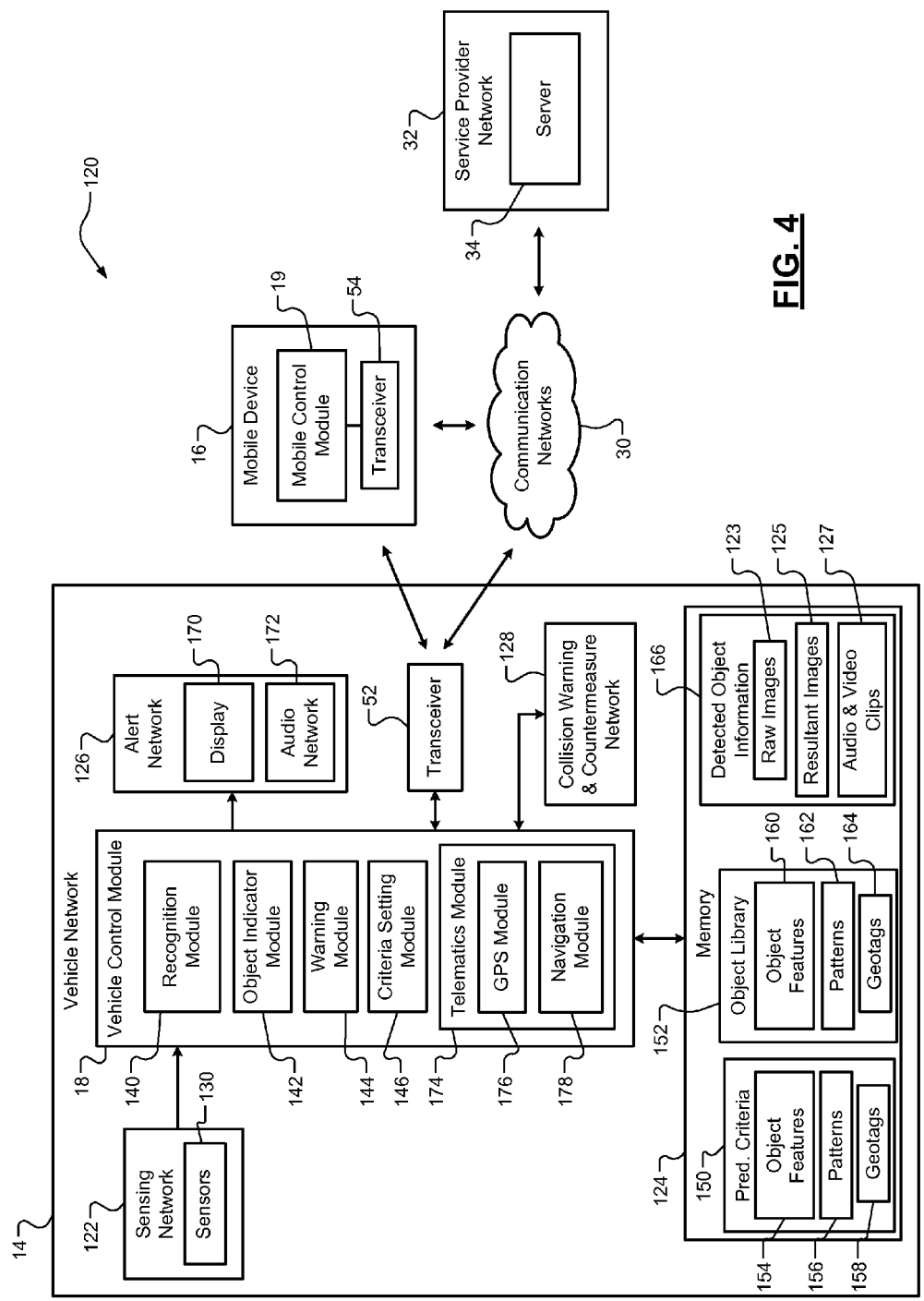
FIG. 4 is a functional block diagram of yet another portion of the object monitoring network of FIG. 1 illustrating a vehicle network in accordance with one implementation of the present disclosure.

In FIG. 1, an object monitoring network 10 is shown. The object monitoring network 10 includes a vehicle 12 with a vehicle network 14 and a mobile device 16. The vehicle 12 can be, for example, an automobile, a motorcycle, or other road driven vehicle. The vehicle network 14 can include a vehicle control module 18, such as a powertrain control module, a collision avoidance and countermeasure module, or other suitable vehicle control module. The vehicle network 14 can include various other devices and modules, some examples of which are shown in FIG. 4. The mobile device 16 can include a mobile control module 19. The mobile device 16 can be a cellular phone, a tablet computer, an electronic notepad, or any other personal electronic handheld device.

Figure 2:
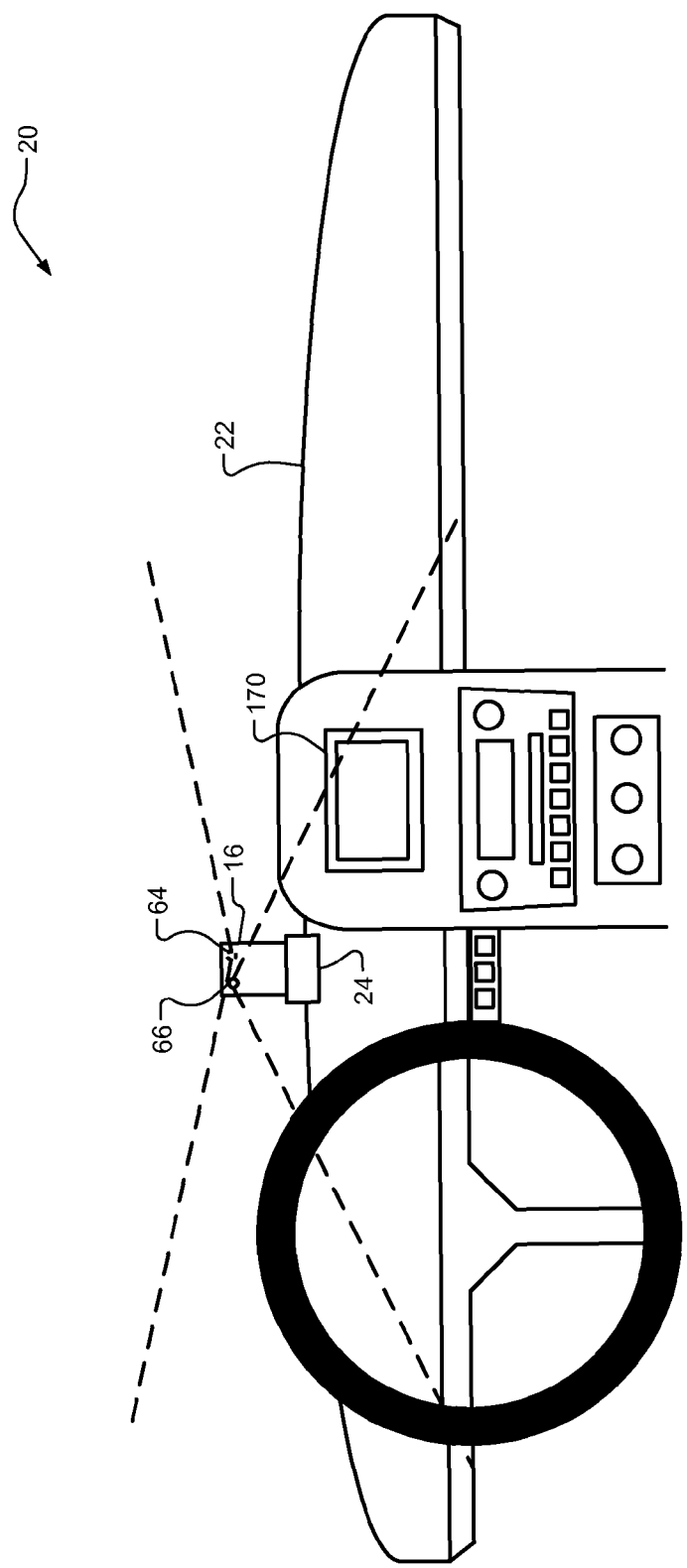
FIG. 2 is a schematic front view of a portion of the object monitoring network of FIG. 1 illustrating an in-vehicle mounting configuration in accordance with one implementation of the present disclosure.

Referring now also to FIG. 2, a portion 20 of the object monitoring network 10 is shown illustrating an in-vehicle mounting configuration. The mobile device 16 can be mounted in the vehicle 12, such as on a dashboard 22 of the vehicle 12 and used to monitor objects in areas of an environment external to the vehicle 12. The mobile device 16 can be configured to be received by a mount 24, which is attached to the dashboard 22. However, many other forms of mounting, to the vehicle 12 or otherwise, are contemplated, and the illustrated mounting is merely one example. The mobile device can include, for example, a case and/or connector that connects to the mount 24.

Referring again to FIG. 1, the object monitoring network 10 can also include one or more communication networks 30 and a service provider network 32. The vehicle network 14 and/or the mobile device 16 can communicate with the service provider network 32 via the communication networks 30. The vehicle network 14 and the mobile device 16 can communicate with the service provider network 32 via the same communication network and/or using different communication networks. The different communication networks can be distinct or overlap such that the communication networks share network devices. The networks 30, 32 can include an Internet, base stations, satellites, gateways, computers, network stations and/or servers (an example server 34 is shown). The service provider network 32 can provide services to the vehicle network 14 and/or the mobile device 16 via the server 34. For example, the service provider network 32 can provide image recognition services to the vehicle network 14 and/or the mobile device 16. The server 34 can include a recognition module 36 and store patterns 38 of various objects. The patterns 38 may include image patterns, audio patterns, and/or video patterns.

In operation, the vehicle network 14 and/or the mobile device 16 monitor an environment external to the vehicle 12. The vehicle network 14 and/or the mobile device 16 may capture and generate images of the environment, record audio of the environment, and/or record video of the environment. The captured images and/or recorded audio and/or video may be associated with an area forward, rearward or on a side of the vehicle. The vehicle 12 may be moving in a direction as to pass through the area monitored. A path of the vehicle 12 may pass through the area monitored.

The vehicle network 14 and/or the mobile device 16 can perform image, audio and/or video recognition or can request that image, audio and/or video recognition be performed by the service provider network 32 and/or the server 34. The vehicle network 14 and/or the mobile device 16 can transmit the captured and/or generated images, audio, video, and/or a conditioned and filtered version of the images, audio and/or video to the service provider network 32. The server 34 can then perform image, audio and/or video recognition to detect objects in the transmitted images, audio and/or video.

While performing image, audio and/or video recognition, the server 34 can compare images, audio, video and/or portions of the images, audio and/or video to the stored patterns 38 and generate an object detection signal. The image, audio and/or video recognition can be performed based on the images, audio and/or video and the patterns 38, geotags 40, and/or object features 42 stored in the server 34. The patterns 38 can include object patterns as well as text patterns. The geotags 40 can be used to: determine geographical locations of objects; predict upcoming objects; monitor certain objects; and/or verify that a detected object is normally located near a current location of the vehicle. The geotags 40 may be generated via a global positioning system and may be associated with an object and/or image having the object. Each of the geotags 40 may include coordinates of an object. This information can be used to efficiently determine what objects are in a path of the vehicle 12 and/or which objects are in an area through which the vehicle 12 is to pass. Location information of the vehicle 12 can be provided to the server 34 for geotag assessment.

The server 34 can scan pixels of the images and compare the pixels to the stored patterns 38 to detect traffic indicators. The images can be conditioned, filtered, averaged, and/or otherwise processed to generate a resultant image. The resultant image can then be compared to the stored patterns. The object features can include sizes, shapes, colors, text, patterns, pixel levels or values, or other features describing an object or traffic indicator. The object features may also have associated audio patterns and/or signatures, which may be compared with audio patterns and/or signatures stored in the server 34. Other suitable image and/or audio recognition techniques can also be used. The server 34 transmits the object detection signal to the vehicle network 14 and/or the mobile device 16.

The vehicle network 14 and/or the mobile device 16 can then determine whether the detected objects satisfy one or more predetermined criteria (hereinafter referred to as predetermined criteria). The predetermined criteria can be stored in the server 34 and can include determining whether an object has certain predetermined features, such as predetermined sizes, shapes, colors, pixel values, transmits a certain audible signature or other object features (some of which are disclosed below). The predetermined criteria can be used to detect certain traffic indicators or other objects of interest. The detected objects that pass the predetermined criteria can be identified as traffic indicators. Some example traffic indicators are traffic control devices and road hazard devices. Traffic control devices include street lights, street signs, traffic lights, and lane markings. Road hazard devices include street signs and lights and road blocks, pylons, and flares indicating a construction zone, an accident, or other road hazard. The vehicle network 14 and/or the mobile device 16 can generate an alert message to alert a vehicle operator of the identified traffic indicators and/or other objects of concern. The vehicle network 14 may interact with the mobile device 16 such that either the vehicle network 14 and/or the mobile device 16 alerts the vehicle operator of a determined condition. The vehicle operator can then respond accordingly based on the alert message and/or the vehicle network 14 may perform an action (e.g., apply vehicle brakes) to prevent, for example, a collision. Various different types of alert messages are described below.

The vehicle network 14 and/or the mobile device 16 can request that certain objects be detected and/or that the service provider network 32 perform image, audio and/or video recognition based on the predetermined criteria. A list of objects to detect and/or the predetermined criteria can be transmitted from the vehicle network 14 and/or the mobile device 16 to the server 34. The list and/or the predetermined criteria can be modified based on input parameters received from a vehicle operator. The input parameters can include objects and/or traffic indicators having certain colors, size, text, shape, and/or other image and/or audio patterns. The input parameters can include types of the objects and/or traffic indicators, whether the object and/or traffic indicator is a light, or other vehicle operator provided input parameters. The types of the objects and/or traffic indicators can include whether the object is a light, a sign, a stop sign, a stop light, a road hazard, a lane marking, an object located at an intersection, or other object type.

The input parameters can be received via one or more vehicle operator input devices. The vehicle network 14 and/or the mobile device 16 can include respective input devices 44, 46. The vehicle operator input devices 44, 46 can be, for example, touch screen displays, touchpads, and/or keyboards.

The input parameters can be driver specific. The vehicle network 14, the mobile device 16 and/or the server 34 can perform image, audio and/or video recognition and alert a vehicle operator of objects and/or traffic indicators based on input parameters and/or object detection settings associated with a current vehicle operator (hereinafter referred to as the vehicle operator) that has a perception deficiency. The perception deficiency may be a visual deficiency, a hearing deficiency and/or other perception deficiency. An example of a visual deficiency is a color-blind deficiency or vehicle operator with a visual limitation. The vehicle operator can select certain objects to detect, monitor and/or track and certain objects not to detect, monitor and/or track.

Figure 3:
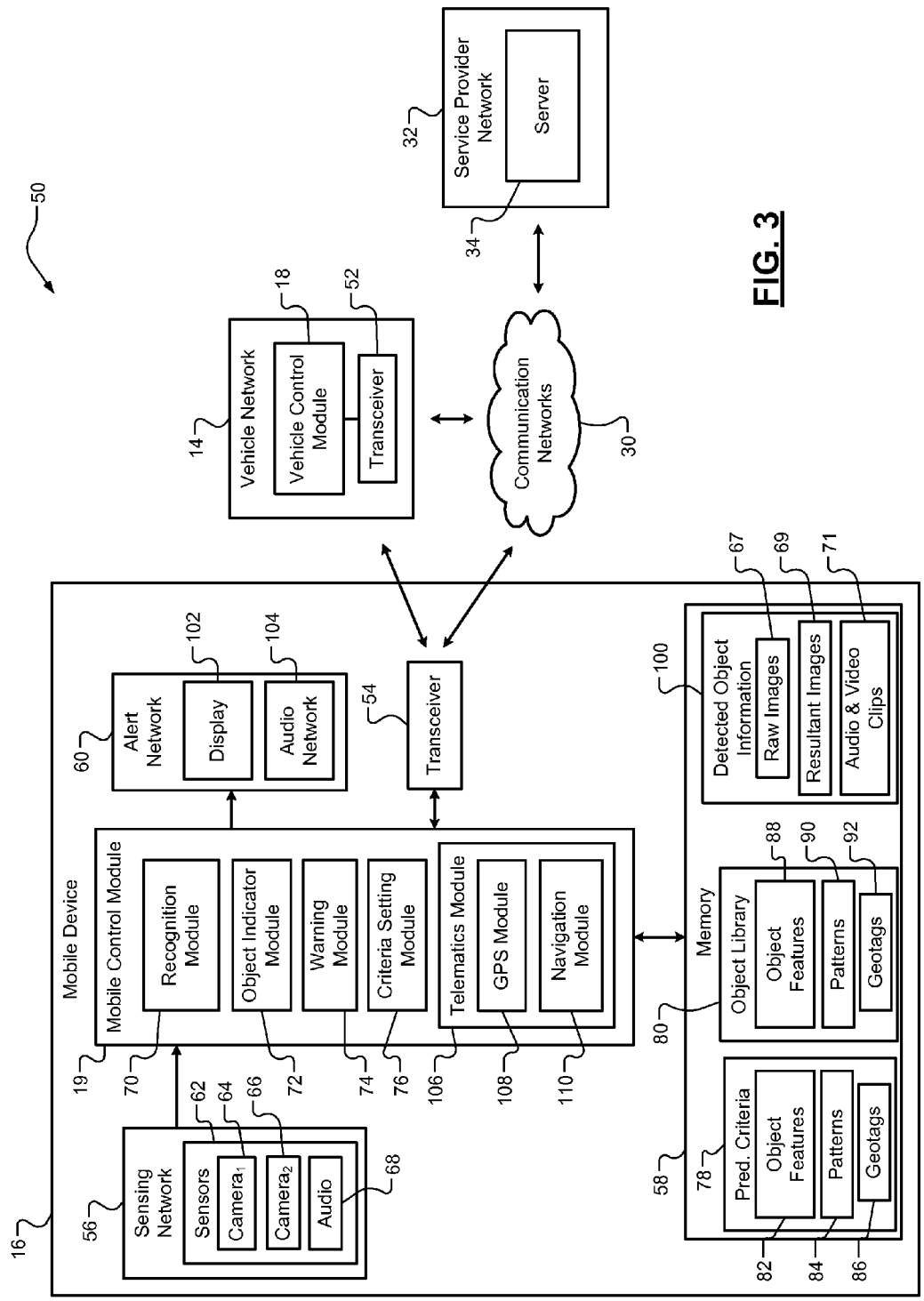
FIG. 3 is a functional block diagram of another portion of the object monitoring network of FIG. 1 illustrating a mobile device in accordance with one implementation of the present disclosure.

Referring now also to FIG. 3, another portion 50 of the object monitoring network 10 is shown. The portion 50 includes the vehicle network 14 with the vehicle control module 18, the mobile device 16, the communication networks 30 and the service provider network 32 with the server 34. The vehicle control module 18 communicates with the mobile device 16 and/or the communication networks 30 via a first transceiver 52. The mobile device 16 communicates with the vehicle network 14 and/or the communication networks 30 via a second transceiver 54. The mobile device 16 includes a sensing network 56, the mobile control module 19, a memory 58 and an alert network 60.

Referring now to FIGS. 2 and 3, the sensing network 56 includes sensors 62, such as cameras and microphones, which are used to monitor, take images, and record audio and/or video of areas external to the vehicle. As an example, the sensing network 56 can include a first camera 64, a second camera 66, and a microphone (or other audio sensor) 68. The first camera 64 can be used to monitor an area forward of the vehicle 12. The second camera 66 can be used to monitor an area rearward of the vehicle 12. If the mobile device 16 is mounted on, for example, the dashboard 22, the first camera 64 can monitor an area forward of the dashboard 22 and the second camera 66 can monitor areas rearward of the dashboard 22. The areas rearward of the dashboard 22 can include an area directly rearward of the vehicle 12 and/or can include blind spot areas. Blind spot areas include areas on the side and/or rearward of a vehicle that cannot be easily observed by a vehicle operator when looking through a rearview mirror and/or side mirrors of the vehicle without the vehicle operator turning his/her head to directly look at the area of concern.

The sensing network 56 can generate, condition, filter, average, and/or otherwise process raw images 67 taken by the cameras 64, 66. The raw images 67 can be stored in the memory 58 and accessed by the mobile control module 19. The sensing network 56 and/or the mobile control module 19 can condition, filter and/or average the raw images 67 to generate resultant images 69, which can also be stored in the memory 58. Recorded audio clips and video clips 71 may also be stored in the memory 100. The raw and/or resultant images 67, 69 and/or the audio and/or video clips 71 can be transmitted from the mobile device 16 via the second transceiver 54 to the vehicle control module 18 and/or the service provider network 32 for object detection and/or image recognition purposes.

The mobile control module 19 includes a recognition module 70, an object indicator module 72, a warning module 74, and a criteria setting module 76. The recognition module 70 can perform image, audio and/or video recognition and/or request that the vehicle network 14 and/or the server perform image, audio and/or video recognition. The recognition module 70 can transmit a recognition request signal to the vehicle network 14 and/or the server 34. The recognition request signal can include the raw images 67, the resultant images 69, the audio and/or video clips 71, as well as the list of objects and/or the predetermined criteria. Results of the image, audio and/or video recognition performed by the vehicle network 14 and/or the server 34 can be transmitted from the vehicle network 14 and/or the server 34 to the mobile device 16 and used by the modules (e.g., the modules 70-76) of the mobile control module 19.

The memory 58 can store one or more predetermined criteria (predetermined criteria 78) and an object library 80. The predetermined criteria 78 can include object features 82, patterns 84 and geotags 86 associated with objects to monitor. The object library 80 refers to a portion of the memory and can include object features 88, patterns 90, and geotags 92 of the monitored objects and other objects not selected to be monitored. The patterns 84, 90 may include image, audio and/or video patterns. The predetermined criteria 78 can include a subset of the object library 80. The object features 82, patterns 84 and geotags 86 associated with the predetermined criteria 78 may not be stored separately from the object library. For example, the predetermined criteria 78 can refer to objects and/or associated object features, patterns and geotags stored in the object library 80.

The recognition module 70 can perform image, audio, and/or video recognition based on the raw and/or resultant images, the audio clips, the video clips, and/or the object features 82, 88, patterns 84, 90 and geotags 86, 92 stored in the memory 58. The object features 82, 88, patterns 84, 90 and geotags 86, 92 can include the object features 42, patterns 38, and geotags 40 stored in the server 34 and/or different object features, patterns, and geotags. The patterns 84, 90 can include object patterns as well as text patterns.

The recognition module 70 can scan pixels of an image and compare the pixels to the patterns 84, 90 to detect certain objects and/or traffic indicators. The recognition module 70 can access a series of raw images (or pictures) of an environment, condition, filter, and/or average the images to generate a resultant image, which is stored in the memory 58 as one of the resultant images 69. The raw images 67 and the resultant images 69 generated by the sensing network 56 and/or the recognition module 70 can then be compared to the patterns 84, 90 to detect objects and/or traffic indicators.

The recognition module 70 can identify detected objects and store information describing the detected objects in the memory 58 as detected object information 100. This can include the raw and resultant images 67, 69 and/or the audio and video clips 71. The detected object information 100 can also include object sizes, shapes, colors, type, geographical location, map location, and/or elevation, and/or audio and/or video patterns and/or signatures. The detected object information 100 can also include pixel numbers and/or intensity values, whether a distance between the object and the vehicle 12 is decreasing or increasing, or other object information.

The object indicator module 72 identifies objects that the vehicle 12 is approaching which satisfy the predetermined criteria 78 based on results from the recognition module 70. The results can include results received from the vehicle network 14 and/or the server 34 based on the recognition request signals transmitted to the vehicle network 14 and/or the server 34. The object indicator module 72 tracks the objects and can generate an impending object signal when the objects are within a predetermined distance of the vehicle 12. The object indicator module 72 can monitor objects with certain predetermined features (e.g., the object features 82), which identify the objects as traffic indicators. The predetermined features are included in the predetermined criteria. For example, the object indicator module 72 can monitor objects determined to be traffic control devices or road hazard devices and/or other devices a vehicle operator has requested to track.

The warning module 74 generates alert messages to signal a vehicle operator of upcoming objects and/or traffic indicators that satisfy the predetermined criteria 78. The alert messages can be provided to the vehicle operator via the alert network 60. The alert network 60 can include a display 102 and an audio network 104. The audio network 104 can include speakers, a horn, a bell, a stereo, or other audio equipment.

Alerting the vehicle operator assures that the vehicle operator is aware of upcoming objects and/or traffic indicators and is provided with information correctly identifying these objects. The alert messages can include highlighting, circling, marking, changing the color of, changing the size of, illuminating, flashing, or otherwise altering the objects and/or traffic indicators on the display 102. The objects are altered such that the objects are not misconstrued by the vehicle operator and are recognizable to the vehicle operator. The alert messages can also include text messages and/or audio alerts provided via the display 102 and/or audio network 104. The alert messages can be provided: on a displayed image of a current vehicle environment; on a map; displayed using a telematics module 106; and/or transmitted to the vehicle control module 18. The telematics module 106 can include a global positioning system (GPS) module 108 and a navigation module 110. The GPS module 108 may be used to generate the geotags 86, 96. For example, a map can be edited to show the alert messages.

The alert messages may be generated based on the perception deficiency of the vehicle operator. As a first example, alert messages providing images with object characteristics recognizable to the vehicle operator may be provided. The alert messages may also include audible alerts recognizable to the vehicle operator. In one implementation, a color-blind vehicle operator is provided with both visual and/or audible alerts recognizable to the vehicle operator. In another implementation, a hearing-impaired vehicle operator is provided with visual and/or audible alerts recognizable to the vehicle operator. As an example, color-blind vehicle operator may be an operator that has a color perception limitation or a visual impairment.

The alert messages can include the type of the traffic indicator (e.g., a traffic light, a street sign, a construction zone indicator), the type of light or street sign, and/or other information describing the traffic indicator. For example, the alert messages and/or information can include: the actual color(s) of the light or sign; whether the light or sign is a stop light, a stop sign or a yield sign; and/or whether the sign is a pedestrian walkway sign, a railroad sign or other sign. The alert messages may include predetermined audible patterns recognizable to the vehicle operator. The audible patterns provided for a detected object may be different than typical audio patterns generated by the detected object.

The criteria setting module 76 can set or adjust the predetermined criteria 78 based on input parameters received from a vehicle operator. For example, the criteria setting module 76 can set the object features 82, the patterns 84 and/or the geotags 86 of objects and/or traffic indicators to monitor. The object features can be provided as input parameters by the vehicle operator and used to set and/or adjust the predetermined criteria 78. For example, a vehicle operator can request that: objects of a certain color, shape, size, and/or type; having a certain image, audio and/or video pattern; and/or having certain text be monitored. The vehicle operator can also select objects not to monitor and/or objects with: certain features;

image, audio and/or video patterns; and/or geotags not to monitor. As an example, a vehicle operator that is color-blind and has difficulty seeing or construing red objects can request stop signs, stop lights and/or objects (e.g., sodium-vapor lights) which can be construed as stop signs or stop lights be monitored.

In one implementation, the criteria setting module 76 can provide a list of objects and/or input parameters and/or corresponding pictures of the objects to the vehicle operator via the display 102. The vehicle operator can then select which objects and/or objects with select parameters to monitor and which objects and/or objects with select parameters not to monitor. When objects are monitored and displayed or altered on the display 102, the vehicle operator can select the objects and/or touch the objects on the display 102 and then request that objects of this type not be monitored. The criteria setting module 76 can then adjust the predetermined criteria 78 accordingly. As the traffic indicators monitored can be adjusted based on inputs from a vehicle operator, the criteria setting module 76 is a learning module.

The warning module 74, when alerting a vehicle operator, can display an image of a current environment and highlight, change the color of, flash, circle, box in, mark, and/or otherwise alter objects on the image. The image can be overlaid over a current live view of the environment, displayed alone, or displayed in addition to displaying a live view of the environment. The warning module 74 can signal the audio network 104 to generate audio messages, tones, and/or sounds to alert the vehicle operator of the objects.

The alert messages generated by the warning module 74 can be provided in an augmented reality (AR), such as a live direct or indirect view of a physical real-world environment. The physical real-world environment can include objects and/or environmental elements augmented based on, for example, video, graphics, global positioning data, and/or navigation data. The warning module 74 can use graphics to overlay an object on or otherwise mark an object in a live view of the environment. For example, when a stop sign is detected, a blinking stop sign can be graphically generated in a color recognizable to the vehicle operator and overlaid over or replace the actual stop sign in the live displayed view of the environment.

The object indicator module 72 can monitor, detect and track objects and/or traffic indicators based on signals from the telematics module 106, the global positioning system module 108, and/or the navigation module 110. For example, the object indicator module 72 can begin monitoring for traffic indicators when a vehicle is approaching an intersection. Although the sensing network 56 can be continuously ON and/or activated (i.e. powered ON) at periodic time intervals, the sensing network 56 can be activated when the vehicle 12 is within a predetermined distance of the intersection. The object indicator module 72, telematics module 106 or other module disclosed herein can, for example, use GPS data, a GPS compass, information from a gyroscope, and/or map information to determine a distance between the vehicle 12 and/or the mobile device 16 and the intersection. The determined distance can then be compared with the predetermined distance. The object indicator module 72 can expect that the intersection has certain objects and/or traffic indicators and can search specifically for those objects and/or traffic indicators and/or for other preselected objects.

Referring now also to FIG. 4, another portion 120 of the object monitoring network 10 is shown. This portion 120 includes the mobile device 16 with the mobile control module 19, the vehicle network 14, the communication networks 30, and the service provider network 32 with the server 34. The mobile device 16 communicates with the vehicle network 14 and the communication networks 30 via the second transceiver 54. The vehicle network 14 communicates with the mobile device 16 and/or the communication networks 30 via the first transceiver 52. The vehicle network 14 includes a sensing network 122, the vehicle control module 18, a memory 124, an alert network 126, and a collision warning and countermeasure network 128.

The sensing network 122 can include various sensors 130 located within the vehicle 12. The sensors 130 can include, for example, image sensors (or cameras) 132, audio sensors, radar sensors, infrared sensors, ultrasonic sensors, lidar sensors, or other suitable sensors. The sensors 130 can be directed away from the vehicle 12 in any direction and scan areas external to the vehicle 12. Any number of sensors can be included and can be used to monitor any number of areas external to the vehicle. Information from the sensors 130 is provided to the vehicle control module 18.

The sensing network 122 can generate, condition, filter, and average sensor signals including raw images 123, audio and/or video clips 127 taken by the sensors 130. The raw images 123 and the audio and/or video clips 127 can be stored in the memory 124 and accessed by the vehicle control module. The sensing network 122 and/or the vehicle control module 18 can condition, filter and/or average the raw images 123 to generate resultant images 125, which can also be stored in the memory 124. The raw and/or resultant images 123, 125 and the audio and/or video clips 127 can be transmitted from the vehicle network 14 via the first transceiver 52 to the mobile control module 19 and/or the service provider network 32 for object detection and/or image recognition purposes.

The vehicle control module 18 includes a recognition module 140, an object indicator module 142, a warning module 144, and a criteria setting module 146. The recognition module 140 can perform image recognition and/or request that the mobile device 16 and/or the server 34 perform image, audio and/or video recognition. The recognition module 140 can transmit a recognition request signal to the mobile device 16 and/or the server 34. The recognition request signal can include the raw images 123, resultant images 125, and/or audio and video clips 127, as well as the list of objects and/or one or more predetermined criteria (predetermined criteria 150). Results of the image, audio and/or video recognition performed by the mobile device 16 and/or the server 34 can be transmitted from the mobile device 16 and/or the server 34 to the vehicle network 14 and used by the modules (e.g., the modules 140-146) of the vehicle control module 18. Results of image, audio and/or video recognition performed by the vehicle network 14 and/or the server 34 can be transmitted from the vehicle network 14 or the server 34 and used by the modules (e.g., the modules 70-76) of the mobile device 16. The predetermined criteria 150 can be the same or different than the predetermined criteria 78 and/or stored in the server 34.

The memory 124 can store the predetermined criteria 150 and an object library 152. The predetermined criteria 150 can include object features 154, image, audio and/or video patterns 156 and geotags 158 associated with objects to monitor. The object library 152 refers to a portion of the memory 124 and can include object features 160, image patterns 162, and geotags 164 of the monitored objects and other objects not selected to be monitored. The predetermined criteria 150 can include a subset of the object library 152. The object features 154, patterns 156 and geotags 158 may not be stored separately from those stored as part of the object library 152.

The recognition module 140 can perform similar to the recognition module 70 and can perform image, audio and/or video recognition based on the raw and/or resultant images 123, 125, the audio and video clips 127, and/or the object features 154, 160, patterns 156, 162 and geotags 158, 164. The object features 154, 160, patterns 156, 162 and geotags 158, 164 can include the object features 42, 80, patterns 38, 90 and/or geotags 40, 92 stored in the mobile device 16 and/or server 34 and/or different object features, patterns and geotags.

The recognition module 140 can scan pixels of an image and compare the pixels to the patterns 156, 162 to detect certain objects and/or traffic indicators. The recognition module 140 can access a series of raw images (or pictures) of an environment, condition, filter, average and/or otherwise process the images to generate a resultant image, which is stored as one of the resultant images 125 in the memory 124. The raw images 123 and the resultant images 125 generated by the sensing network and the recognition module 140 can then be compared to the patterns 156, 162 to detect objects and/or traffic indicators.

The recognition module 140 can identify detected objects and store information describing the detected objects in the memory 124 as detected object information 166. The detected object information 166 can include object sizes, shapes, colors, type, geographical location, map location, and/or elevation and/or audio and/or video patterns and/or signatures. The detected object information 166 can also include pixel numbers and/or intensity values, whether a distance between the object and the vehicle 12 is decreasing or increasing, or other object information.

The object indicator module 142 can perform similar to the object indicator module 72 and identifies objects that the vehicle 12 is approaching that satisfy the predetermined criteria 150 based on results from the recognition module 140. The results can include results received from the mobile device 16 and/or the server 34 based on the recognition request signals. The object indicator module 142 tracks the objects and can generate an impending object signal when the objects are within a predetermined distance of the vehicle 12. The object indicator module 142 can monitor objects with certain predetermined features (e.g., the object features 154), which identify the objects as traffic indicators. The predetermined features are included in the predetermined criteria 150. The vehicle operator can input parameters and/or select objects to monitor via the mobile device 16 and/or the vehicle network 14.

The warning module 144 can perform similar to the warning module 74 and generate alert messages to signal a vehicle operator of upcoming objects and/or traffic indicators that satisfy the predetermined criteria 150. The alert messages can be provided to the vehicle operator via the alert network 126. The alert network 126 can include a display 170 and an audio network 172. The display 170 can be a vehicle heads-up display; a display mounted on or in a dashboard of a vehicle; or other suitable display. An example of the display 170 is shown in FIG. 2. The audio network 172 can include speakers, a horn, a bell, a stereo, or other audio equipment.

The alert messages can include highlighting, circling, marking, changing the color of, changing the size of, illuminating, flashing, or otherwise altering the objects and/or traffic indicators on the display 170. The alert messages can also include text messages and/or audio alerts provided via the display 170 and/or audio network 172. The alert messages can be provided: on a displayed image of a current vehicle environment; on a map; displayed using a telematics module 174; and/or transmitted to the vehicle control module 18. The telematics module 174 can include a GPS module 176 and a navigation module 178. For example, a map can be edited to show the alert messages. The alert messages can include the type of the traffic indicator.

The criteria setting module 146 can perform similar to the criteria setting module 76 and can set or adjust the predetermined criteria 150 based on input parameters received from a vehicle operator. For example, the criteria setting module 146 can set the object features, the geotags, and/or the patterns of objects and/or traffic indicators to monitor. The object features can be provided as input parameters by the vehicle operator and used to set and/or adjust the predetermined criteria 150.

In one implementation, the criteria setting module 146 can provide a list of objects, input parameters, corresponding pictures of the objects, and/or audio and/or video clips of the objects to the vehicle operator via the display 170 and/or the audio network 172. The vehicle operator can then select which objects and/or objects with select parameters to monitor and which objects and/or objects with select parameters not to monitor. When objects are monitored and displayed or altered on a display of the alert network, the vehicle operator can select the objects and/or touch the objects on the display 170 and then request that objects of this type not be monitored. The criteria setting module 146 can then adjust the predetermined criteria 150 accordingly. As the traffic indicators monitored can be adjusted based on inputs from a vehicle operator, the criteria setting module 146 is a learning module.

The warning module 144, when alerting a vehicle operator, can display an image of a current environment and highlight, change the color of, flash, circle, box in, mark, and/or otherwise alter objects on the image. The image can be overlaid over a current live view of the environment, displayed alone, or displayed in addition to displaying a live view of the environment. The warning module 144 can signal the audio network 172 to generate audio messages, tones, and/or sounds to alert the vehicle operator of the objects.

The alert messages generated by the warning module 144 can be provided in an AR, as described above with respect to the warning module 74. The warning module 144 can use graphics to overlay an object on or otherwise mark an object in a live view of the environment.

The object indicator module 142 can monitor, detect and track objects and/or traffic indicators based on signals from the telematics module 174, the global positioning system module 176, and/or the navigation module 178. For example, the object indicator module 142 can begin monitoring for traffic indicators when a vehicle is approaching an intersection. Although the sensing network 122 can be continuously ON and/or activated (i.e. powered ON) at periodic time intervals, the sensing network 122 can be activated when the vehicle 12 is within a predetermined distance of the intersection. The object indicator module 142 can expect that the intersection has certain objects and/or traffic indicators and can search specifically for those objects and/or traffic indicators and/or for other preselected objects.

The collision warning and countermeasure network 128 can alert a vehicle operator of a potential collision and/or perform countermeasures to prevent a collision. The collision warning and countermeasure network 128 can include the vehicle control module 18, the sensing network 122, the alert network 126, a vehicle powertrain, a brake system, an airbag system, safety pretensioners, safety restraints, and/or other collision warning and countermeasure networks, devices and/or modules.

The collision warning and countermeasure network 128 can alert the vehicle operator and/or perform the countermeasures based on signals from the sensing network 122, the object indicator module 142, the warning module 144, the telematics module 174, the global positioning system module 176, and/or the navigation module 178. The collision warning and countermeasure network 128 can be located within the vehicle and receive signals from networks, devices and/or modules in the mobile device 16. The collision warning and countermeasure network 128 can perform countermeasures, such as adjusting safety restraints, alerting a vehicle operator of a possible collision, in response to the detected objects, distances between the vehicle and the objects, and/or actions performed by the vehicle operator.

The techniques disclosed herein include networks and modules, which can each be incorporated in a vehicle and/or a mobile device. An example of the networks and modules being located in a vehicle and in a mobile device are shown in FIGS. 1 and 2. The networks and modules include the sensing networks 56, 122, the recognition modules 70, 140, object indicator modules 72, 142, the memories 58, 124, the warning modules 74, 144, the criteria setting modules 76, 146, and the telematics modules 106, 174. Each of these networks and modules can be located in the vehicle network and not in the mobile device, in the mobile device and not in the vehicle network or in both the vehicle network and the mobile device, as shown. Information collected and/or determined by the vehicle network and the mobile device can be shared with each other.

As an example, image, audio, and/or video recognition can be performed by the vehicle network 14, the mobile device 16, and/or the server 34. When image, audio, and/or video recognition is performed by the mobile device 16, the vehicle network 14 may not include a recognition module and/or a portion of the recognition module 140. When image, audio, and/or video recognition is performed by the vehicle network 14, the mobile device 16 may not include a recognition module and/or a portion of the recognition module 70. When image recognition is performed by the server 34, the vehicle network 14 and the mobile device 16 may not include a recognition module and/or portions of the recognition modules 70, 140.

The mobile device 16 and the vehicle network 14 can perform image, audio, and/or video recognition based on information stored in the respective memories 58, 124, as well as compare image, audio, and/or video recognition results with each other and/or results provided by the server 34. The mobile device 16 and the vehicle network 14 can then report the results in the form of alert messages to the vehicle operator via the warning modules 74, 144 and alert networks 60, 126. When conflicts arise between results provided by the mobile device 16, the vehicle network 14 and/or the server 34, the mobile device 16 and/or the vehicle network 14 can rank or prioritize the results. For example, the mobile device 16 and/or the vehicle network 14 can rank results received from the vehicle network 14 higher than results received from the mobile device 16. The highest ranking results as determined by the vehicle network 14 and/or the mobile device 16 can be provided to the vehicle operator to assure that the mobile device 16 does not provide different results than the vehicle network 14.

The networks disclosed herein can each be identified as a system. For example, the vehicle network 14, the service provider network 32, the sensing networks 56, 122, the alert networks 60, 126, the audio networks 104, 172, and the collision warning and countermeasure network 128 can be identified respectively as a vehicle system, a service provider system, sensing systems, alert systems, audio systems, and a collision warning and countermeasure system.

The vehicle network 14 and the mobile device 16 can each perform object recognition, image recognition, audio and/or video recognition. The vehicle network 14 and the mobile device 16 can each perform alert a vehicle operator based on objects detected by the sensors of the vehicle network 14 and/or sensors of the mobile device 16. In one implementation, the vehicle network 14 is sued to detect objects and the mobile device 16 is used to alert the vehicle operator of the detected objects. In another implementation, the mobile device 16 is used to detect objects and the vehicle network 14 is used to alert the vehicle operator of detected objects.

Figure 5:
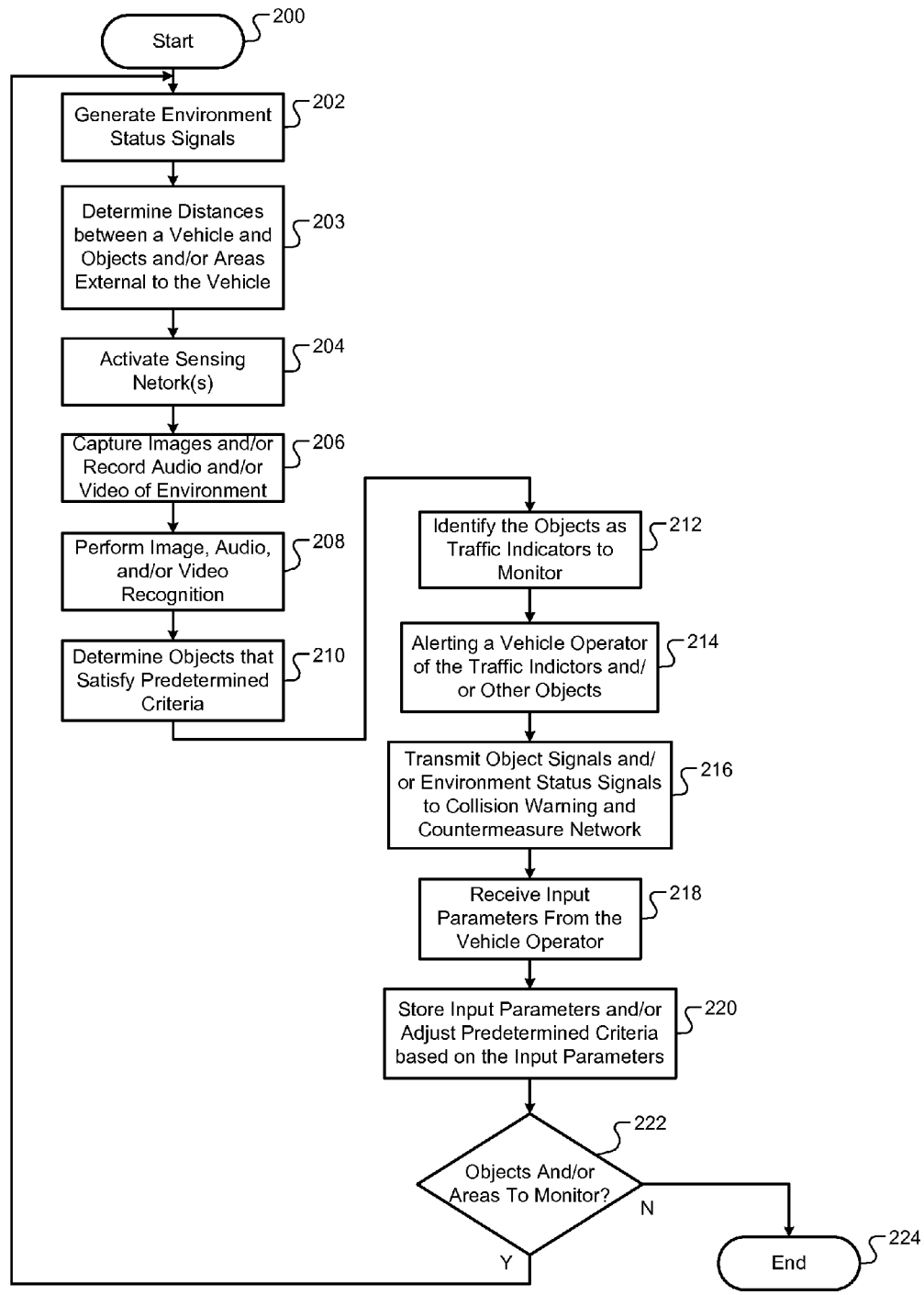
FIG. 5 is a flow diagram of an example traffic indicator technique in accordance with one implementation of the present disclosure.

The above-described object monitoring network 10 can be operated using numerous techniques. An example technique (or computer-implemented method) is provided in FIG. 5. In FIG. 5, a traffic indicator method is shown. Although the following tasks are primarily described with respect to the implementations of FIGS. 1-4, the tasks can be easily modified to apply to other implementations of the present disclosure. The tasks can be iteratively performed. The technique can begin at 200.

At 202, at least one of the telematics modules 106, 174 detects an upcoming intersection, landmark, predetermined geographical locations, crossing areas, and/or other predetermined road transition areas and generates environment status signals. A predetermined road transition area can include, for example, an intersection area, an area where a road or lane splits into two lanes, an entrance ramp, and/or an exit ramp. Some examples of crossing areas are pedestrian crossing areas, railroad crossing areas, and areas with a bridge and/or tunnel. The environment status signals indicate the status of the environment including identifying objects including vehicles, pedestrians, ramps, intersections, landmarks, crossing areas. The environmental status signals can indicate locations of the objects, traffic status and events, and other events, such as when the vehicle 12 is within a predetermined distance of an intersection and/or an object. The environment status signals can be transmitted between the vehicle network 14 and the mobile device 16.

At 203, the at least one of the telematics modules 106, 174 can determine distances between the vehicle 12 and the intersection, landmark, predetermined geographical location, crossing area, and/or other predetermined road transition area (or area external to the vehicle 12). The at least one telematics modules 106, 174 can also determine distances between the vehicle 12 and one or more objects at the intersection, landmark, predetermined geographical location, crossing area, and/or other predetermined road transition area. The objects can be objects that satisfy predetermined criteria (e.g., the predetermined criteria 78, 150), as determined in the following tasks. The determined distances can be reported in the environment status signals.

At 204, the vehicle control module 18 activates the sensing network 56 and/or the mobile control module 19 activates the sensing network 122 based on one or more of the environment status signals. The sensing networks 56, 122 are activated to monitor upcoming objects in a path of the vehicle 12. The sensing networks 56, 122 can be activated, for example, when the vehicle 12 is within a predetermined distance of one of the objects and/or within a predetermined distance of the intersection, landmark, predetermined geographical location, crossing area, and/or other predetermined road transition area. Tasks 202 and 204 may not be performed when one or more of the sensing networks 56, 122 are maintained in an activated state.

At 206, sensors of the sensing networks 56, 122 capture images, record audio and/or record video of the environment and store the corresponding images, audio clips, and/or video clips in memory. The sensing networks 56, 122 can generate image signals that include the images and/or audio and/or video signals that include the audio clips and the video clips. The image signals and/or audio and/or video signals can be transmitted between the vehicle network 14 and the mobile device 16.

At 208, at least one of the recognition modules 70, 140 performs image, audio, and/or video recognition and/or requests that image, audio, and/or video recognition be performed. The image, audio, and/or video recognition is performed to detect objects in a path of the vehicle. Each of the recognition modules 70, 140 can perform image, audio, and/or video recognition and/or generate a recognition request signal, as described above. Results of image, audio, and/or video recognition processes performed by the recognition modules 70, 140 and/or by the server 34 can be shared with the vehicle network 14 and the mobile device 16.

The image, audio, and/or video recognition can be activated based on environment status signals such that the image, audio, and/or video recognition is activated during certain traffic events or other events. For example, the image, audio, and/or video recognition can be activated when the vehicle is within a predetermined distance of an intersection. This would help reduce false positives on, for example, a highway when the vehicle network 14 and/or the vehicle operator is only interested in objects, such as red lights in an intersection and minimize power consumed for image, audio, and/or video recognition.

At 210, at least one of the object indicator modules 72, 142 determines which ones of the detected objects satisfy the predetermined criteria. Examples of the predetermined criteria are described above. As another example, the predetermined criteria can include object features. The object features can include patterns of traffic indicators or other object features with colors, image, audio, and/or video patterns predetermined as indiscernible or marginally discernible by a vehicle operator. An object with marginally discernible features may be an object with questionably discernible features. In other words, the vehicle operator may be unsure, based on the features of the object as sensed by the vehicle operator what type of object is seen and/or heard. A vehicle operator may not be able to estimate or determine a type of an object with indiscernible features. A vehicle operator is able to determine a type of an object with discernible features. The predetermined criteria can be shared between the vehicle network 14 and the mobile device 16.

At 212, at least one of the object indicator modules 72, 142 can identify the objects that satisfy the predetermined criteria as traffic indicators and/or objects to monitor and other objects as objects not to monitor. The detected objects that satisfy the predetermined criteria can have one or more of the patterns.

At 214, at least one of the warning modules 74, 144 signals one or more of the alert networks 60, 126 to alert the vehicle operator of the objects: identified as the traffic indicators; having the one or more of the patterns; and/or satisfying the predetermined criteria, as described above. This can include altering images of the objects on a display of the vehicle network and/or on a display of the mobile device, displaying text messages, generating audible alerts, etc. This assures that the vehicle operator is aware of these traffic indicators and is provided with information correctly identifying the traffic indicators. The vehicle operator can then act accordingly based on the information provided.

At 216, the warning modules 74, 144 can transmit object signals and/or the environment status signals to the collision warning and countermeasure network 128. The object signals can include the objects identified by the object indicator modules, information describing the objects, and distances of the objects. At 218, the collision warning and countermeasure network 128 can perform countermeasures based on the object signals, as described above.

The collision warning and countermeasure network 128 can also perform countermeasures based on behavior of the vehicle operator. The vehicle operator can, for example, attempt to accelerate or decelerate the vehicle based on the object information provided. The collision warning and countermeasure network 128 can determine that acceleration and/or deceleration is appropriate or inappropriate based on the object signals and/or other object information determined by the collision warning and countermeasure network 128. The other object information can include, for example, distances, speeds and direction of travel of other vehicles relative to the vehicle 12.

At 220, the vehicle operator can enter input parameters in the vehicle network 14 and/or the mobile device 16 via the vehicle operator input devices 44, 46. This can include the vehicle operator touching previously identified objects and/or other objects on one of the displays 102, 170 and indicating whether the objects should or should not be monitored.

At 222, one or more of the criteria setting modules 76, 146 can store the input parameters and select image, audio and/or video patterns, objects types, objects, geotags, or other object features to monitor based on the input parameters. The criteria setting modules 74, 146 can adjust the predetermined criteria based on the input parameters. This can include removing or editing object features, patterns, and/or geotags stored in the predetermined criteria sections of the memories 58, 124.

At 224, the vehicle control module 18, the mobile control module 19, and/or one or more of the telematics modules 106, 174 can determine if there are any objects and/or areas to continue to monitor. If there are objects and/or areas to monitor, one of the tasks 203-222 or task 202 can be performed, as shown. If there are not any objects and/or areas to monitor, the method can end at 224.

The above-described tasks are meant to be illustrative examples; the tasks can be performed sequentially, synchronously, simultaneously, continuously, during overlapping time periods or in a different order depending upon the application. For example, the tasks 220-222 can be performed prior to task 202 or 206.

Example implementations are provided so that this disclosure will be thorough, and will fully convey the scope to those who are skilled in the art. Numerous specific details are set forth such as examples of specific components, devices, and methods, to provide a thorough understanding of implementations of the present disclosure. It will be apparent to those skilled in the art that specific details need not be employed, that example implementations may be embodied in many different forms and that neither should be construed to limit the scope of the disclosure. In some example implementations, well-known procedures, well-known device structures, and well-known technologies are not described in detail.

The terminology used herein is for the purpose of describing particular example implementations only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example implementations.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the implementations has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    monitoring, via a sensor associated with at least one of a vehicle and a mobile device, an environment external to the vehicle, wherein the monitoring of the environment includes recording audio signals of the environment based on an output of the sensor;
performing audio recognition based on the audio signals via a recognition module of the mobile device;
detecting, at the mobile device and based on results of the audio recognition, objects in an area through which the vehicle is to pass;
determining, at the mobile device, which ones of the detected objects satisfy one or more predetermined criteria, the one or more predetermined criteria including object features that are indiscernible or marginally discernible to a vehicle operator with a hearing deficiency, the object features including audible signatures predetermined to be marginally discernible or indiscernible by the vehicle operator;
identifying, at the mobile device, selected ones of the detected objects to monitor when the selected ones of the detected objects satisfy the one or more predetermined criteria; and
alerting the vehicle operator of the selected ones of the detected objects with an alert predetermined to be discernible to the vehicle operator, the selected ones identified as having one or more of the audible signatures.

2. The computer-implemented method of claim 1, further comprising monitoring the environment via a sensing network including:
monitoring the area via the sensor, wherein the sensing network comprises the sensor and a second sensor; and
monitoring a second area via a second sensor,
wherein the audio signals or the video signals are generated based on an output of the second sensor.

3. The computer-implemented method of claim 1, further comprising:
capturing, by the mobile device, images of the environment while performing the monitoring of the environment;
generating, at the mobile device, an image signal that represents the captured images;
performing image recognition based on the image signal via the recognition module of the mobile device; and
detecting, at the mobile device, the detected objects in the area based on the image recognition.

4. The computer-implemented method of claim 1, wherein:
the identifying of the selected ones of the detected objects comprises identifying the selected ones of the detected objects as traffic indicators; and
the alert predetermined to be discernible to the vehicle operator identifies the detected objects as traffic indicators.

5. The computer-implemented method of claim 1, wherein:
the identifying of the selected ones of the detected objects comprises identifying the selected ones of the detected objects as traffic indicators; and
the alert predetermined to be marginally discernible or indiscernible to the vehicle operator identifies the detected objects as traffic indicators.

6. The computer-implemented method of claim 1, wherein the alert predetermined to be discernible to the vehicle operator is at least one of an audio alert and a video alert when the vehicle operator has a visual deficiency.

7. The computer-implemented method of claim 1, wherein the alert predetermined to be discernible to the vehicle operator is a video alert when the vehicle operator has a hearing deficiency.

8. A computer-implemented method, comprising:
receiving, via a criteria setting module within a mobile device, input parameters defining at least one object to monitor;
storing the input parameters in memory of the mobile device;
determining objects to monitor and objects not to monitor based on the input parameters, wherein the input parameters are received from a vehicle operator;
monitoring, via a sensing network mounted within the mobile device, an environment external to a vehicle, the monitoring of the environment including capturing, by the mobile device and from within the vehicle, images of the environment;
generating, at the mobile device, an image signal that represents the captured images;
performing image recognition based on the image signal and the input parameters via a recognition module of the mobile device;
detecting, at the mobile device, objects in a path of the vehicle based on results of the image recognition;
identifying, at the mobile device, selected ones of the detected objects as traffic indicators to monitor based on one or more predetermined criteria, the one or more predetermined criteria including patterns of the traffic indicators; and
alerting, via the mobile device, a vehicle operator of the detected objects identified as having one or more of the patterns.

9. The computer-implemented method of claim 8, wherein:
the image recognition is activated to perform during a predetermined event; and
the predetermined event includes the vehicle arriving within a predetermined distance of an intersection.

10. The computer-implemented method of claim 9, further comprising:
determining that the vehicle is within the predetermined distance of the intersection based on at least one of global positioning system data, information from a gyroscope, and map information; and
activating image recognition when the vehicle is within the predetermined distance.

11. The computer-implemented method of claim 8, wherein the sensing network monitors the environment via image sensors mounted at least one of in and on the mobile device.

12. The computer-implemented method of claim 8, further comprising:
generating, at the mobile device, a recognition request signal based on the image signal;
transmitting the recognition request signal from the mobile device to at least one of a vehicle network in the vehicle and a server external to the vehicle;
receiving, at the mobile device, image recognition results from the at least one of the vehicle network and the server; and
identifying, at the mobile device, the selected ones of the detected objects based on the image recognition results from the at least one of the vehicle network and the server.

13. The computer-implemented method of claim 8, wherein alerting the vehicle operator comprises altering an image of the detected objects having the one or more of the patterns in an augmented reality of the environment displayed on the mobile device.

14. The computer-implemented method of claim 8, further comprising:
- determining, at the mobile device, a direction of travel of the vehicle;
- based on the direction of travel, monitoring, at the mobile device, one of (i) an area forward of the vehicle and (ii) an area at least one of on a side of the vehicle and rearward of the vehicle; and
- generating, at the mobile device, the image signal based on the monitoring of the one of (i) the area forward of the vehicle and (ii) the area at least one of on the side of the vehicle and rearward of the vehicle.

15. The computer-implemented method of claim 8, further comprising:
- determining, at the mobile device, a geographical position of the vehicle via a global positioning system;
- detecting, at the mobile device, an upcoming intersection based on the geographical position and navigation data;
- activating, at the mobile device, at least a portion of the sensing network based on detection of the intersection; and
- performing image recognition to detect objects in the intersection,
- wherein alerting the vehicle operator comprises indicating types of objects in the intersection.

16. A mobile device, comprising:
- a criteria setting module configured to receive input parameters defining at least one object to monitor;
- a memory configured to store the input parameters;
- a sensor configured to (i) monitor an environment external to a vehicle, (ii) capture images of the environment from within the vehicle via sensors of the mobile device, and (ii) generate an image signal representing the captured images;
- a recognition module configured to: (i) at least one of perform image recognition and request performance of the image recognition based on the image signal, and (ii) detect objects in a path of the vehicle based on results of the image recognition, wherein the image recognition is based on the input parameters;
- an object indicator module configured to identify selected ones of the detected objects as traffic indicators to monitor based on one or more predetermined criteria, the one or more predetermined criteria include patterns of the traffic indicators; and
- an alert network configured to alert a vehicle operator of the detected objects identified as having one or more of the patterns.

17. The mobile device of claim 16, wherein:
- the recognition module is configured to (i) generate a recognition request signal based on the image signal, and (ii) transmit the recognition request signal from the mobile device within the vehicle to at least one of a vehicle network in the vehicle and a server external to the vehicle;
- the mobile device further comprises a transceiver configured to receive image recognition results from the at least one of the vehicle network and the server; and
- the object indicator module is configured to identify the selected ones of the detected objects based on the image recognition results from the at least one of the vehicle network and the server.

18. The mobile device of claim 16, wherein the alert network is configured to alert the vehicle operator by altering an image of the detected objects having the one or more of the patterns displayed on the mobile device.

19. The mobile device of claim 16, wherein the alert network is configured to alert the vehicle operator by altering an image of the detected objects having the one or more of the patterns in an augmented reality of the environment displayed on the mobile device.

20. The mobile device of claim 16, further comprising:
- a sensing network comprising the sensor; and
- a telematics module configured to determine a direction of travel of the vehicle,
- wherein, based on the direction of travel, the sensing network is configured to monitor one of (i) an area forward of the vehicle and (ii) an area at least one of on a side of the vehicle and rearward of the vehicle, and
- wherein the sensing network is configured to generate the image signal based on the monitoring of the one of (i) the area forward of the vehicle and (ii) the area at least one of on the side of the vehicle and rearward of the vehicle.

21. The mobile device of claim 16, further comprising:
- a global positioning system configured to determine a geographical position of the vehicle;
- a navigation system configured to detect an upcoming intersection based on the geographical position and navigation data; and
- a control module configured to activate at least a portion of the sensor based on detection of the intersection,
- wherein the recognition module is configured to perform image recognition to detect objects in the intersection, and
- wherein the alerting of the vehicle operator comprises indicating types of objects in the intersection.

22. A computer-implemented method, comprising:
- monitoring, via a sensing network of a mobile device, an environment external to the vehicle;
- generating, at the mobile device, an image signal;
- performing image recognition based on the image signal via a recognition module of the mobile device;
- detecting, at the mobile device, objects in a path of the vehicle based on results of the image recognition;
- identifying, at the mobile device, selected ones of the detected objects as traffic indicators to monitor based on one or more predetermined criteria, the one or more predetermined criteria including object features representative of patterns of the traffic indicators; and
- alerting, via an alert network, a vehicle operator of the detected objects identified as having one or more of the patterns by altering an image of the detected objects having the one or more of the patterns displayed on the mobile device.

23. The computer-implemented method of claim 22, wherein the sensing network monitors the environment via image sensors mounted at least one of in and on the vehicle.

24. The computer-implemented method of claim 22, wherein the sensing network monitors the environment via image sensors mounted at least one of in and on the mobile device.

25. The computer-implemented method of claim 22, further comprising:
- generating, at the mobile device, a recognition request signal based on the image signal;
- transmitting the recognition request signal from the mobile device within the vehicle to at least one of a vehicle network in the vehicle and a server external to the vehicle;
- receiving, at the mobile device, image recognition results from at least one of the vehicle network and the server; and identifying, at the mobile device, the selected ones of the detected objects based on the image recognition results from the at least one of the vehicle network and the server.

26. The computer-implemented method of claim 22, further comprising:
   signaling, via the mobile device, one of a vehicle control module and a countermeasure network of the detected objects having the one or more of the patterns;
   determining, at the mobile device, distances between the vehicle and the detected objects having the one or more of the patterns;
   monitoring, at the mobile device, vehicle operator behavior performed in response to the alerting; and
   performing a countermeasure based on the detected objects having the one or more of the patterns, the distances, and the vehicle operator behavior.

27. The computer-implemented method of claim 22, wherein the altering the image of the detected objects having the one or more of the patterns displayed on the mobile device comprises altering the image of the detected objects having the one or more of the patterns in an augmented reality of the environment displayed on the mobile device.

28. The computer-implemented method of claim 1, wherein the alerting the vehicle operator of the selected ones comprises altering an image of the detected objects displayed on the mobile device.

29. The computer-implemented method of claim 28, wherein the altering the image of the detected objects displayed on the mobile device comprises altering the image of the detected objects in an augmented reality of the environment displayed on the mobile device.

30. The computer-implemented method of claim 8, wherein the alerting the vehicle operator of the detected objects comprises altering an image of the detected objects displayed on the mobile device.

* * * * *